(12) United States Patent
Im et al.

(10) Patent No.: US 11,316,543 B2
(45) Date of Patent: Apr. 26, 2022

(54) PORTABLE COMMUNICATION DEVICE SUPPORTING MULTIPLE WIRELESS COMMUNICATION PROTOCOLS

(71) Applicant: Samsung Electronics Co., Ltd., Gyeonggi-do (KR)

(72) Inventors: Hoyoung Im, Gyeonggi-do (KR); Jeongheum Lee, Gyeonggi-do (KR); Sungchul Park, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/777,235

(22) Filed: Jan. 30, 2020

(65) Prior Publication Data

US 2020/0252090 A1 Aug. 6, 2020

(30) Foreign Application Priority Data

Feb. 1, 2019 (KR) .................. 10-2019-0013980

(51) Int. Cl.
*H04B 1/00* (2006.01)
*H04W 88/06* (2009.01)

(52) U.S. Cl.
CPC .......... *H04B 1/0053* (2013.01); *H04W 88/06* (2013.01)

(58) Field of Classification Search
CPC .... H04B 1/0053; H04B 1/0057; H04B 1/006; H04B 1/406; H04B 1/0067; H04B 1/0064;

(Continued)

(56) References Cited

U.S. PATENT DOCUMENTS 8,135,348 B2 3/2012 Aparin
10,505,700 B1* 12/2019 Lan .................. H04B 1/525
(Continued)

FOREIGN PATENT DOCUMENTS

KR 10-0611100 8/2006
KR 1020070010856 1/2007
(Continued)

OTHER PUBLICATIONS

International Search Report dated May 12, 2020 issued in counterpart application No. PCT/KR2020/001518, 9 pages.

*Primary Examiner* — Ankur Jain
(74) *Attorney, Agent, or Firm* — The Farrell Law Firm, P.C.

(57) ABSTRACT

A portable communication device is Provided for supporting multiple different communication networks. The portable communication device includes an antenna configured to receive a first signal of a first frequency band corresponding to a first cellular network, and a second signal of a second frequency band corresponding to a second cellular network; a first communication circuit electrically connected to the antenna and corresponding to the first cellular network; a second communication circuit electrically connected to the antenna and corresponding to the second cellular network; a distributor configured to electrically connect the antenna to the first communication circuit and the second communication circuit; a first low noise amplifier (LNA) connected between the distributor and the first communication circuit; and a second LNA connected between the distributor and the second communication circuit. While one of the first communication circuit and the second communication circuit is not driven, the other communication circuit is configured to be driven.

19 Claims, 7 Drawing Sheets

(58) Field of Classification Search
CPC ...... H04B 1/401; H04W 48/18; H04W 88/02; H04W 88/06; H04W 52/52; H03F 1/0205; H03F 3/24; H03G 3/3042
See application file for complete search history.

(56) References Cited

U.S. PATENT DOCUMENTS

| | | |
|---|---|---|
| 2002/0132597 A1* | 9/2002 | Peterzell ................ H03D 3/009 455/130 |
| 2003/0143967 A1* | 7/2003 | Ciccarelli ............ H04B 1/0003 455/232.1 |
| 2006/0034228 A1 | 2/2006 | Kim et al. |
| 2007/0243832 A1 | 10/2007 | Park et al. |
| 2009/0161627 A1* | 6/2009 | Ekambaram ...... H04W 72/1215 370/331 |
| 2009/0275355 A1 | 11/2009 | Tan et al. |
| 2013/0189969 A1 | 7/2013 | Periyalwar et al. |
| 2015/0065073 A1 | 3/2015 | Yan et al. |
| 2016/0174280 A1* | 6/2016 | Singh .................... H04W 76/15 370/329 |
| 2017/0339635 A1* | 11/2017 | Jalkanen ........... H04W 52/0212 |
| 2018/0368082 A1 | 12/2018 | O'Shea et al. |

FOREIGN PATENT DOCUMENTS

| | | |
|---|---|---|
| KR | 10-1179897 | 8/2012 |
| KR | 1020160048100 | 5/2016 |
| KR | 10-2129051 | 7/2020 |

\* cited by examiner

FIG. 6

| 4G | 5G | RFFE CONTROL RIGHT |
|---|---|---|
| Active | Active | 4G CP OR 5G CP |
| Active | Idle | 4G CP |
| Idle | Active | 5G CP |
| Active or Idle | Sleep | 4G CP |
| Sleep | Active or Idle | 5G CP |

PORTABLE COMMUNICATION DEVICE SUPPORTING MULTIPLE WIRELESS COMMUNICATION PROTOCOLS

CROSS-REFERENCE TO RELATED APPLICATION(S)

This application is based on and claims priority under 35 U.S.C. § 119 to Korean Patent Application No. 10-2019-0013980, filed on Feb. 1, 2019, in the Korean Intellectual Property Office, the entire disclosure of which is incorporated herein by reference.

BACKGROUND

1. Field

The disclosure relates generally to a portable communication device and, more particularly, to a portable communication device supporting multiple wireless communication protocols.

2. Description of Related Art

An electronic device (e.g., a portable communication device) may include at least one antenna for transmitting/receiving a signal to/from an external device (e.g., a base station), and a radio frequency (RF) front end module for connecting each antenna and a communication circuit inside the electronic device, and processing a transmitted/received signal. The portable communication device includes an RF front end module and an antenna which can support a specified frequency and protocol according to a commercially available communication technology.

As communication technologies develop, communication standards for providing higher transmission speed and communication quality have been prescribed and commercialized. Accordingly, a portable communication device may include an RF front end module and an antenna that can support multiple wireless communication protocols.

If a portable communication device supports multiple wireless communication protocols, an antenna and an RF front end module can be shared by the wireless communication protocols. However, if an antenna and an RF front end module are shared by multiple wireless communication protocols, there is often a problem in that, while one communication circuit is deactivated, other communication circuits supporting the other communication protocols are also deactivated.

SUMMARY

Accordingly, the disclosure is provided to address at least the problems and/or disadvantages described above and to provide at least the advantages described below.

An aspect of the disclosure is to provide a portable communication device and method supporting multiple wireless communication protocols that can solve a problem caused by sharing an antenna and an RF front end module.

In accordance with an aspect of the disclosure, a portable communication device is provided, which includes an antenna configured to receive a first signal of a first frequency band corresponding to a first cellular network, and a second signal of a second frequency band corresponding to a second cellular network; a first communication circuit electrically connected to the antenna and corresponding to the first cellular network; a second communication circuit electrically connected to the antenna and corresponding to the second cellular network; a distributor configured to electrically connect the antenna to the first communication circuit and the second communication circuit; a first low noise amplifier (LNA) connected between the distributor and the first communication circuit; and a second LNA connected between the distributor and the second communication circuit. While one of the first communication circuit and the second communication circuit is not driven, the other communication circuit is configured to be driven.

In accordance with another aspect of the disclosure, a method is provided for controlling a portable communication device, which includes an antenna configured to receive a first signal of a first frequency band corresponding to a first cellular network, and a second signal of a second frequency band corresponding to a second cellular network, a first communication circuit electrically connected to the antenna and corresponding to the first cellular network, a second communication circuit electrically connected to the antenna and corresponding to the second cellular network, a distributor configured to electrically connect the antenna to the first communication circuit and the second communication circuit, a first low noise amplifier (LNA) connected between the distributor and the first communication circuit, and a second LNA connected between the distributor and the second communication circuit. The method includes driving, while one of the first communication circuit and the second communication circuit is not driven, the other communication circuit.

In accordance with another aspect of the disclosure, a non-transitory storage medium is provided for storing commands that are readable by a portable communication device including an antenna configured to receive a first signal of a first frequency band corresponding to a first cellular network, and a second signal of a second frequency band corresponding to a second cellular network, a first communication circuit electrically connected to the antenna and corresponding to the first cellular network, a second communication circuit electrically connected to the antenna and corresponding to the second cellular network, a distributor configured to electrically connect the antenna to the first communication circuit and the second communication circuit, a first low noise amplifier (LNA) connected between the distributor and the first communication circuit, and a second LNA connected between the distributor and the second communication circuit. The commands, when read, control driving of, while one of the first communication circuit and the second communication circuit is not driven, the other communication circuit.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 6 illustrates a table showing a state of a communication processor and a control right over an RF front end module according to an embodiment.

DETAILED DESCRIPTION

Various embodiments of the disclosure will now be described in detail with reference to the accompanying drawings. In the following description, specific details such as detailed configuration and components are merely provided to assist the overall understanding of these embodiments. Therefore, it should be apparent to those skilled in the art that various changes and modifications of the embodiments described herein can be made without departing from the scope and spirit of the disclosure. In addition, descriptions of well-known functions and constructions are omitted for clarity and conciseness.

Figure 1:
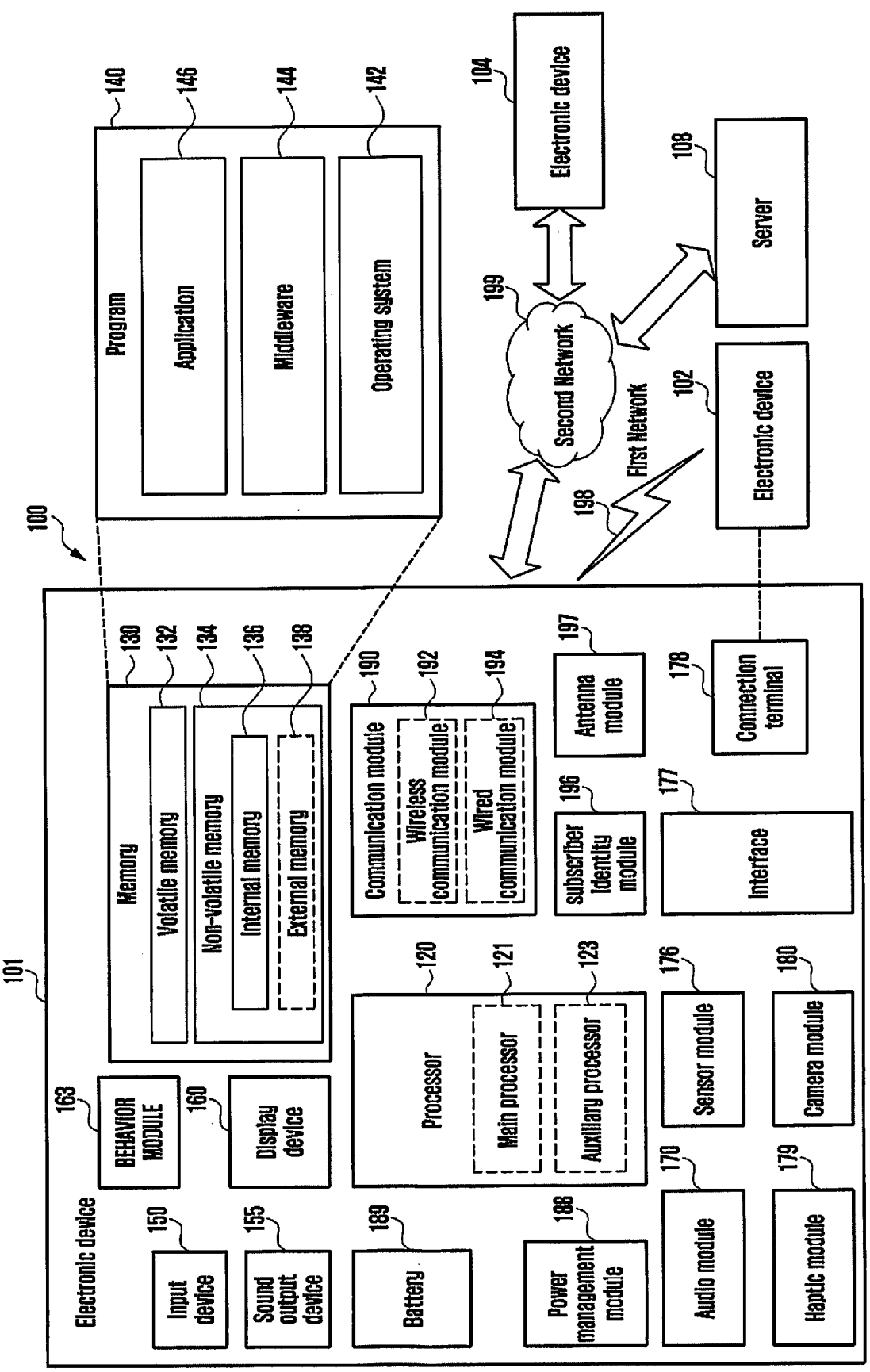
FIG. 1 illustrates an electronic device in a network according to an embodiment.

FIG. 1 illustrates an electronic device in a network environment according to an embodiment.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108.

The electronic device 101 includes a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, and an antenna module 197. Alternatively, at least one of the components (e.g., the display device 160 or the camera module 180) may be omitted from the electronic device 101, or one or more other components may be added in the electronic device 101.

Further, some of the components may be implemented as single integrated circuitry. For example, the sensor module 176 (e.g., a fingerprint sensor, an iris sensor, or an illuminance sensor) may be implemented as embedded in the display device 160.

The processor 120 may execute software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134.

The processor 120 includes a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121, while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include software (e.g., the program 140) and input data or output data for a command related thereto. The memory 130 may include the volatile memory 132 or the non-volatile memory 134.

The program 140 may be stored in the memory 130 as software, and includes, for example, an operating system (OS) 142, middleware 144, and an application 146.

The input device 150 may receive a command or data to be used by other component (e.g., the processor 120) of the electronic device 101, from the outside (e.g., a user) of the electronic device 101. The input device 150 may include a microphone, a mouse, a keyboard, or a digital pen (e.g., a stylus pen).

The sound output device 155 may output sound signals to the outside of the electronic device 101. The sound output device 155 may include a speaker or a receiver. The speaker may be used for general purposes, such as playing multimedia or playing record, and the receiver may be used for an incoming calls. The receiver may be implemented as separate from, or as part of the speaker.

The display device 160 may visually provide information to the outside (e.g., a user) of the electronic device 101. The display device 160 may include a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, and/or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include a high definition multimedia interface (HDMI), a universal serial bus (USB) interface, a secure digital (SD) card interface, and/or an audio interface.

A connecting terminal 178 may include a connector via which the electronic device 101 may be physically connected with the external electronic device 102. The connecting terminal 178 may include an HDMI connector, a USB connector, an SD card connector, and/or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include a motor, a piezoelectric element, and/or an electric stimulator.

The camera module 180 may capture a still image or moving images. The camera module 180 may include one or more lenses, image sensors, ISPs, or flashes.

The power management module 188 may manage power supplied to the electronic device 101. The power management module 188 may be implemented as at least part of a power management integrated circuit (PMIC).

The battery 189 may supply power to at least one component of the electronic device 101. The battery 189 may include a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. The communication module 190 includes a wireless communication module 192 (e.g., a cellular communication module, a short-range wireless communication module, or a global navigation satellite system (GNSS) communication module) and a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., an international mobile subscriber identity (IMSI)) stored in the subscriber identification module 196.

The antenna module 197 may transmit or receive a signal or power to or from the outside (e.g., the external electronic device) of the electronic device 101. The antenna module 197 may include an antenna including a radiating element composed of a conductive material or a conductive pattern formed in or on a substrate (e.g., a printed circuit board (PCB)).

The antenna module 197 may include a plurality of antennas. In such a case, at least one antenna appropriate for a communication scheme used in the communication network, such as the first network 198 or the second network 199, may be selected by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used.

An electronic device according to an embodiment may include a portable communication device (e.g., a smartphone), a computer device, a portable multimedia device, a portable medical device, a camera, a wearable device, a home appliance, etc. However, the electronic devices herein are not limited to the examples described above.

It should be appreciated that various embodiments of the disclosure and the terms used therein are not intended to limit the technological features set forth herein to particular embodiments and include various changes, equivalents, or replacements for a corresponding embodiment.

With regard to the description of the drawings, similar reference numerals may be used to refer to similar or related elements.

A singular form of a noun corresponding to an item may include one or more of the things, unless the relevant context clearly indicates otherwise.

Herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases.

Further, such terms as "1st" and "2nd," or "first" and "second" may be used to simply distinguish a corresponding component from another, and do not limit the components in other aspect (e.g., importance or order).

If an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

Herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor 120 of the machine may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Herein, the term "non-transitory" means that the storage medium is a tangible device, and does not include a signal (e.g., an electromagnetic wave). However, non-transitory does not differentiate between where data is semi-permanently stored in the storage medium and where the data is temporarily stored in the storage medium.

A method according to embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. Alternatively, one or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 2:
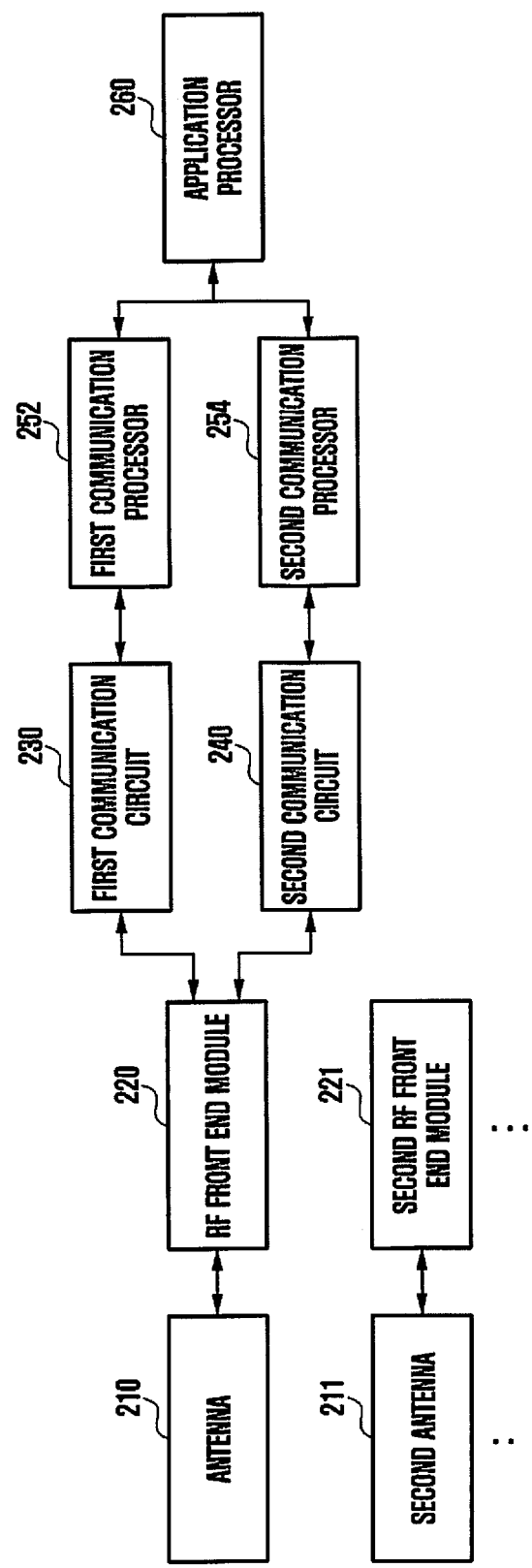
FIG. 2 illustrates a portable communication device according to an embodiment.

FIG. 2 illustrates a portable communication device according to an embodiment.

Referring to FIG. 2, a portable communication device includes an antenna 210, an RF front end module 220, a first communication circuit 230, a second communication circuit 240, a first CP 252, a second CP 254, an AP 260, and a memory. Alternatively, the portable communication device is not limited to a configuration illustrated in FIG. 2, and may further include at least one of the configuration and functions of the electronic device 101 of FIG. 1. Further, the first CP 252 and the second CP 254 may be replaced by a CP configured by one chipset and performing all functions of the first CP 252 and the second CP 254.

Although only the antenna 210 and a second antenna 211 are illustrated in FIG. 2, the portable communication device may also include three or more antennas.

The second antenna 211 (or any other additional antennas) may be connected to each RF front end module like the antenna 210, and each RF front end module may be electrically connected to the first communication circuit 230 and the second communication circuit 240. An RF front end module connected to each antenna may have the same configuration, but the configuration may be partially different according to a function of each antenna 210. Hereinafter, technical features of the portable communication device will be described based on the configuration of the RF front end module 220 connected to the antenna 210.

The antenna 210 may receive a signal (e.g., radio waves) from another external device (e.g., a base station), or may transmit, to the outside, a signal (e.g., radio waves) input through a CP 250 and the RF front end module 220. The antenna 210 may be designed to receive or transmit a signal of a specific frequency band, but the frequency band may correspond to a wide range so as to cover a first frequency band and a second frequency band which will be described later. The first frequency band and the second frequency band may correspond to the same band, bands at least partially overlapping each other, or bands discrete from each other.

The antenna 210 may receive a first signal belonging to a first frequency band corresponding to a first cellular network, and a second signal belonging to a second frequency band corresponding to a second cellular network. The first cellular network and the second cellular network may be wireless communication networks supporting different wireless communication protocols. For example, the first cellular network may be at least one of a second generation communication network, a third generation communication network, and a long term evolution (LTE) communication network, and the second cellular network may be a fifth generation new radio (NR) communication network.

The first frequency band corresponding to the first cellular network and the second frequency band corresponding to the second cellular network may at least partially overlap each other. For example, the first frequency band may be a 2583 MHz to 2603 MHz band, and the second frequency band may be a 2543 MHz to 2643 MHz band.

The first frequency band and the second frequency band may be bands discrete from each other. For example, the first frequency band may be a 2496 MHz to 2516 MHz band, and the second frequency band may be a 2543 MHz to 2643 MHz band.

In the above embodiments, the antenna 210 may be designed to receive a signal of a 2496 MHz to 2690 MHz band, and thus may receive signals of both the first frequency band and the second frequency band. The numerical values of the frequency bands may is merely an example and may include various frequency bands used (or able to be used) in the first cellular network and the second cellular network.

The antenna 210 may be a reception antenna for receiving a signal of an external device (e.g., a base station of the first cellular network or the second cellular network), or may be a transmission/reception antenna capable of both receiving and transmitting a signal.

The RF front end module 220 may connect the antenna 210 and various components (e.g., the first communication circuit 230 and the second communication circuit 240) of the portable communication device which performs RF communication. While only the RF front end module 220 and a second RF front end module 221 are illustrated in FIG. 2, the portable communication device may include three or more RF front end modules corresponding to the number of antennas.

The RF front end module 220 may be electrically connected to the antenna 210, the first communication circuit 230, and the second communication circuit 240 in order to transmit, to the first communication circuit 230 or the second communication circuit 240, a signal (e.g., at least one of the first signal and the second signal) received from the antenna 210.

The RF front end module 220 can perform functions of filtering and amplifying a signal received or transmitted through the antenna. The RF front end module 220 may include a transmitting terminal (Tx) front end module, a receiving terminal (Rx) front end module, a transmission/reception front end module capable of both transmission and reception, etc. The transmission/reception front end module can perform a function of separating transmission and reception signals. Further, the RF front end module 220 may be classified as a front end module capable of supporting legacy communications, such as a second generation communication network, a third generation communication network, and a LTE communication network, and a front end module capable of supporting a fifth generation communication network.

The RF front end module 220 may include configurations of a distributor, at least one LNA, etc.

The first communication circuit 230 may be electrically connected to the antenna 210 and the RF front end module 220. The first communication circuit 230 may correspond to the first cellular network (e.g., legacy communication schemes such as a second generation communication network, a third generation communication network, and an LTE communication network), and a first signal received from the antenna 210 may be input to the first communication circuit 230 through the RF front end module 220.

The second communication circuit 240 may be electrically connected to the antenna 210 and the RF front end module 220. The second communication circuit 240 may correspond to the second cellular network (e.g., a fifth generation NR communication network), and a second signal received from the antenna 210 may be input to the second communication circuit 240 through the RF front end module 220.

The portable communication device may be configured such that while one communication circuit between the first communication circuit 230 and the second communication circuit 240 is not driven, the other communication circuit is driven.

The portable communication device may support connected mode discontinuous reception (CDRX) technology for at least one of the first cellular network and the second cellular network. CDRX technology is for discontinuously receiving data while maintaining a connection state in which a wireless link is configured, if there is no data communication between the portable communication device and a base station for a predetermined time, in order to reduce the battery usage of the portable communication device. The portable communication device may switch the first communication circuit 230 into an inactive (e.g., idle or sleep) state in response to receiving a CDRX command from a base station of the first cellular network (e.g., a second generation communication network, a third generation communication network, and an LTE communication network), and switch the second communication circuit 240 into an inactive state in response to receiving a CDRX command from a base station of the second cellular network (e.g., a fifth generation NR network).

For example, if the first communication circuit 230 corresponding to the first cellular network is switched into an inactive state, the first communication circuit 230 and some components of the RF front end module 220 connected thereto may be turned off together. Since some components of the RF front end module 220 are commonly used for the first cellular network and the second cellular network, according to an embodiment of the disclosure, if the first communication circuit 230 is switched into an inactive state, the second communication circuit 240 and the RF front end module 220 may be maintained in an active state. Therefore, if the second signal of the second cellular network is received through the antenna 210, the second signal may be input to the second communication circuit 240.

The first CP 252 may be electrically connected to the first communication circuit 230 and the AP 260. The first CP 252 can perform functions of demodulating the first signal of the first frequency band received through the antenna 210, and modulating data to be transmitted through the antenna 210.

The second CP 254 may be electrically connected to the second communication circuit 240 and the AP 260. The second CP 254 can perform functions of demodulating the second signal of the second frequency band received through the antenna 210, and modulating data to be transmitted through the antenna 210.

While the first communication circuit 230 is activated and the second communication circuit 240 is deactivated, the first CP 252 may control the first communication circuit 230 and the second communication circuit 240. While the second communication circuit 240 is activated and the first communication circuit 230 is deactivated, the second CP 254 may control the first communication circuit 230 and the second communication circuit 240.

The first CP 252 and the second CP 254 may be replaced by a CP configured by one chipset and performing all the functions of the first CP 252 and the second CP 254. In this case, the CP may be electrically connected to the first communication circuit 230, the second communication circuit 240, and the AP 260 to perform various functions such as control of the first communication circuit 230 and the second communication circuit 240 by the first CP 252 and the second CP 254, and signal modulation/demodulation.

The AP 260 may be configured to perform data processing or operations related to communication and control of each component of the electronic device, and may include at least some of the configuration and functions of a processor 120 of FIG. 1. The AP 260 may be operably and/or electrically connected to internal components of the portable communication device, such as the first CP 252, the second CP 254, the first communication circuit 230, and the second communication circuit 240.

The AP 260 may control the first communication circuit 230 and the second communication circuit 240 such that while one communication circuit between the first communication circuit 230 and the second communication circuit 240 is not driven, the other communication circuit is driven. For example, if the first communication circuit 230 enters a CDRX state and is not driven, the AP 260 may control the second communication circuit 240 to be driven. The AP 260 may control at least one of the first CP 252 and the second CP 254 in the above situation, in order to allow at least one of the first CP 252 and the second CP 254 to control the first communication circuit 230 and the second communication circuit 240.

Figure 3:
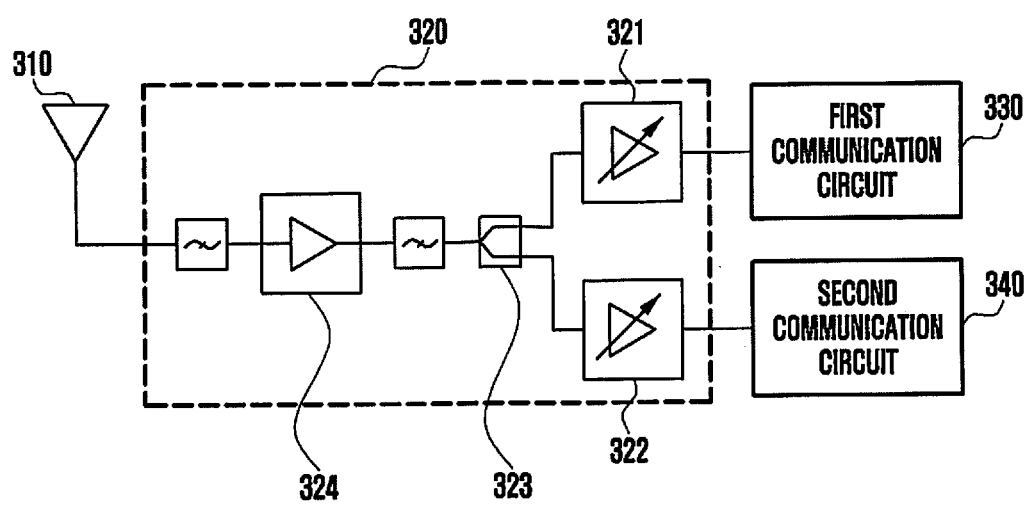
FIG. 3 illustrates a circuit diagram of a portable communication device according to an embodiment.

FIG. 3 illustrates a circuit diagram of a portable communication device according to an embodiment.

Referring to FIG. 3, an antenna 310 may receive a first signal belonging to a first frequency band corresponding to a first cellular network (e.g., a second generation communication network, a third generation communication network, and an LTE communication network), and a second signal belonging to a second frequency band corresponding to a second cellular network (e.g., a fifth generation NR network. A signal input through the antenna 310 may be the first signal or the second signal, or the first signal and the second signal may be simultaneously input.

A first communication circuit 330 may be electrically connected to the antenna 310 and may correspond to the first cellular network. A second communication circuit 340 may be electrically connected to the antenna 310 and may correspond to the second cellular network.

An RF front end module 320 includes a distributor 323, a first LNA 321, a second LNA 322, and a third LNA 324. Alternatively, components inside the RF front end module 320 may be modularized, or may be configured by separate components.

The distributor 323 may electrically connect the antenna 310 to the first communication circuit 330 and the second communication circuit 340. The portable communication device may receive the first signal and the second signal by using the antenna 310, the first signal may be processed by the first communication circuit 330, and the second signal may be processed by the second communication circuit 340. Therefore, a signal input from the antenna 310 may be transmitted to two paths by using the distributor 323.

In order to use the first cellular network (e.g., a second generation communication network, a third generation communication network, and an LTE communication network) and the second cellular network (e.g., a fifth generation NR network) together by using one antenna 310, different paths are configured to be connected to the first communication circuit 330 and the second communication circuit 340, respectively. However, the same internal system path as that of the RF front end module 320 may also be used, as illustrated in FIG. 3, due to the structural limitation of the antenna 310.

A predetermined loss (e.g., 3 dB) may occur since signals of the same frequency are distributed to two paths when passing through the distributor 323. The portable communication device may include at least one LNA (e.g., the first LNA 321, second LNA 322, and third LNA 324) in order to compensate for such degradation in performance.

The first LNA 321 may be connected between the distributor 323 and the first communication circuit 330. A signal having a loss through the distributor 323 may be amplified by the first LNA 321 and input to the first communication circuit 330.

The second LNA 322 may be connected between the distributor 323 and the second communication circuit 340. A signal having a loss through the distributor 323 may be amplified by the second LNA 322 and input to the second communication circuit 340.

At least one of the first communication circuit 330 and the second communication circuit 340 may be configured to control a gain for at least one of the first LNA 321 and the second LNA 322, based on an electric field of a signal received through the distributor 323. For example, the first communication circuit 330 may adjust a first gain for the first LNA 321, based at least partially on a first electric field corresponding to the first signal, and the second communication circuit 340 may adjust a second gain for the second LNA 322, based at least partially on a second electric field corresponding to the second signal. Since electric fields received by the antenna 310 from a base station of the first cellular network or a base station of the second cellular network are different according to the location of the portable communication device, at least one of the first communication circuit 330 and the second communication circuit 340 may control a gain for at least one of the first LNA 321 and the second LNA 322 according to each electric field.

The first communication circuit 330 may adjust the gain for the first LNA 321 with respect to the first signal obtained through the distributor 323, and the second communication circuit 340 may adjust the gain for the second LNA 322 with respect to the second signal obtained through the distributor 323.

The portable communication device may include the third LNA 324 electrically connected between the antenna 310 and the distributor 323. A signal input through the antenna 310 may be amplified by the third LNA 324 and input to the distributor 323. The third LNA 324 may have a fixed gain.

Figure 4:
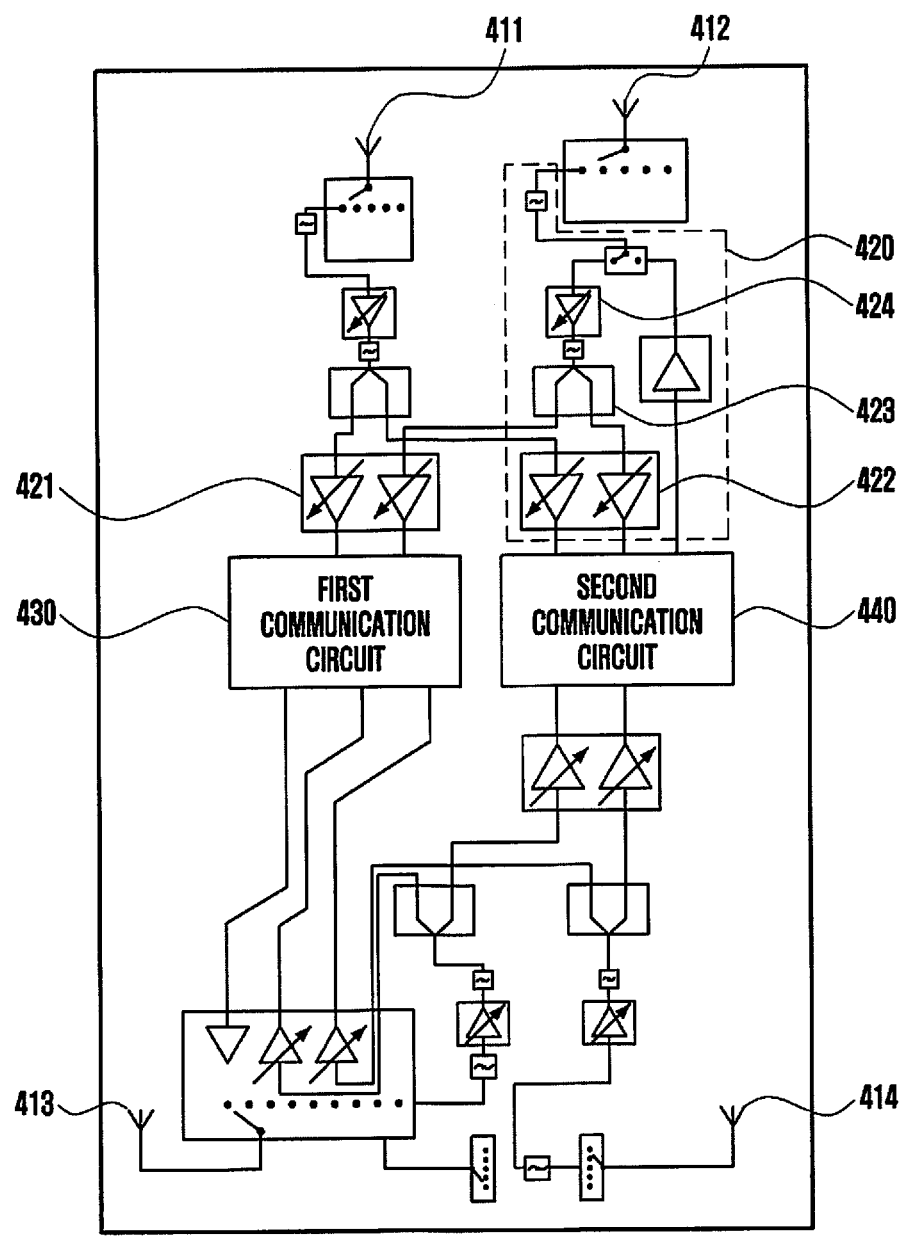
FIG. 4 illustrates a circuit diagram of a portable communication device according to an embodiment.

FIG. 4 illustrates a circuit diagram of a portable communication device according to an embodiment.

Referring to FIG. 4, the portable communication device includes a first main antenna 413, a second main antenna 414, a first sub antenna 411, and a second sub antenna 412. The first main antenna 413 and the second sub antenna 412 among the four antennas may be used for both reception and transmission, and the second main antenna 414 and the first sub antenna 411 may be used for reception of a signal. The four antennas 411, 412, 413, and 414 may receive a first signal belonging to a first frequency band corresponding to a first cellular network, and a second signal belonging to a second frequency band corresponding to a second cellular network.

A first communication circuit 430 and a second communication circuit 440 may receive a signal input to the first main antenna 413, the second main antenna 414, the first sub antenna 411, and the second sub antenna 412. An RF front end module may be disposed between the antennas 411, 412, 413, and 414 and the first communication circuit 430 or the second communication circuit 440.

A second RF front end module 420 connected to the second sub antenna 412 includes a switching circuit 426. The switching circuit 426 may switch between a transmission path and a reception path under the control of the second communication circuit 440. A third LNA 424 may be disposed in the reception path, and a signal amplified by the third LNA 424 may be distributed by the distributor 423 to be input to a first LNA 421 and a second LNA 422. The first LNA 421 may amplify a received signal and transmit the same to the first communication circuit 430, and the second LNA 422 may amplify a received signal and transmit the same to the second communication circuit 440.

At least one of the first communication circuit 430 and the second communication circuit 440 may be configured to control a gain for at least one of the first LNA 421 and the second LNA 422, based on an electric field of a signal received through the distributor 423. For example, the first communication circuit 430 may adjust a first gain for the first LNA 421, based at least partially on a first electric field corresponding to the first signal, and the second communication circuit 440 may adjust a second gain for the second LNA 422, based at least partially on a second electric field corresponding to the second signal.

Since electric fields received by the antenna from a base station of the first cellular network or a base station of the second cellular network are different according to the location of the portable communication device, at least one of the first communication circuit 430 and the second communication circuit 440 may control a gain for at least one of the first LNA 421 and the second LNA 422 according to each electric field.

The first communication circuit 430 may process an input first signal to provide the first signal to a CP 252 or an AP 260. The second communication circuit 440 may process an input second signal to provide the second signal to a CP 254 or an AP.

Figure 5:
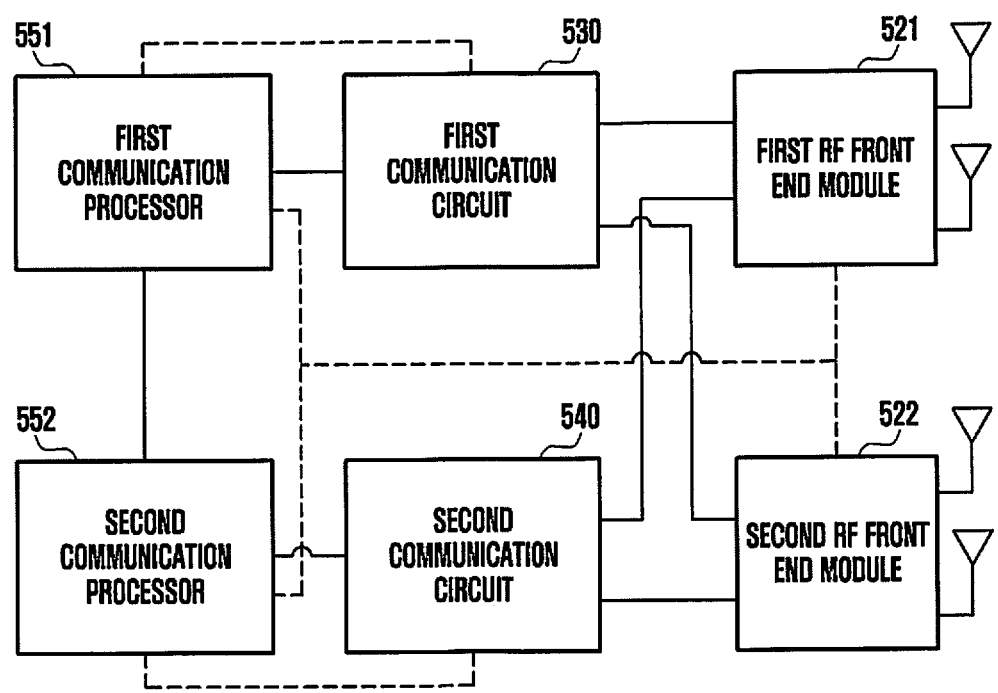
FIG. 5 illustrates a circuit diagram of a portable communication device according to an embodiment.

FIG. 5 illustrates a circuit diagram of a portable communication device according to an embodiment. More specifically, FIG. 5 illustrates a method for providing a control signal by a communication processor wherein an RF front end module and an antenna are shared by a first cellular network and a second cellular network.

Referring to FIG. 5, a portable communication device includes a first CP 551, a second CP 552, a first communication circuit 530, a second communication circuit 540, a first RF front end module 521, and a second RF front end module 522. The first RF front end module 521 and the second RF front end module 522 may be partially shared. The first CP 551 may correspond to the first CP 252 of FIG. 2, the second CP 552 may correspond to the second CP 254 of FIG. 2. Alternatively, a CP configured by a chipset may perform functions of the first CP 551 and the second CP 552.

The first communication circuit 530 and the second communication circuit 540 are connected to the first CP 551 and the second CP 552, respectively, and are not shared by signals of the first cellular network and the second cellular network. Therefore, the first communication circuit 530 may be controlled according to a control signal of the first CP 551, and the second communication circuit 540 may be controlled according to a control signal of the second CP 552.

However, a problem may occur if the first RF front end module 521 and the second RF front end module 522 receive control signals of the first communication circuit 530 and the second communication circuit 540, respectively. Accordingly, the portable communication device may control at least one of the first RF front end module 521 and the second RF front end module 522 by using a control signal of the first communication circuit 530, and may control at least one of the first RF front end module 521 and the second RF front end module 522 by using a control signal of the second communication circuit 540.

To this end, the first RF front end module 521 and the second RF front end module 522 may be connected to both control lines of the first CP 551 and the second CP 552, and thus may be configured to be selectively controlled by the first CP 551 or the second CP 552.

If the first communication circuit 530 is in an active state and the second communication circuit 540 is in an inactive state, the portable communication device may transmit a control signal to the first communication circuit 530 and the second communication circuit 540 by using the first CP 551. If the second communication circuit 540 is in an active state and the first communication circuit 530 is in an inactive state, the portable communication device may transmit the control signal to the first communication circuit 530 and the second communication circuit 540 by using the second CP 552.

The first RF front end module 521 and the second RF front end module 522 may include a plurality of control signal ports. The impedance of a control signal port of the CP 551 or 552 not having a control right may be changed to be high, in order to prevent reception of a control signal by a control signal port of the other CP from being affected.

Alternatively, if the first RF front end module 521 or the second RF front end module 522 includes one control signal port, the first RF front end module 521 or the second RF front end module 522 may be configured to selectively receive a control signal from the first CP 551 or the second CP 552 by adding a multiplexer (not shown).

FIG. 6 illustrates a table showing a state of a communication processor and a control right over an RF front end module according to an embodiment.

More specifically, FIG. 6 illustrates a table showing CPs having a control right over a first RF front end module 521 and a second RF front end module 522 according to a state of a first cellular network (e.g., a second generation communication network, a third generation communication network, and an LTE communication network) and a second cellular network (e.g., a fifth generation NR network).

A portable communication device 500 may control at least one of the first RF front end module and the second RF front end module by using a control signal of a first CP 551, and may control at least one of the first RF front end module and the second RF front end module by using a control signal of a second CP 552. Accordingly, the first CP and the second CP may include a comprehensive control signal generator for providing a control signal to an RF front end module.

Referring to FIG. 6, if a first communication circuit (4G) and a second communication circuit (5G) are both active, one of the first communication processor (4G CP) and the second communication processor (5G CP) may be selected to control the first RF front end module and the second RF front end module. If the second CP has a control right, the second CP may receive a communication state (e.g., band, channel, transmission power, etc.) of the first cellular network through a sync connection between the first CP and the second CP. The second CP may combine the communication state of the first cellular network and a communication state of the second cellular network to generate a control signal for a shared RF front end module, and transmit the control signal to the first RF front end module and the second front end module.

Further, if the first communication circuit is in an active state and the second communication circuit is in an idle state, the first CP has a control right. If the first communication circuit is in an idle state and the second communication circuit is in an active state, the second CP has a control right. If the first communication circuit is in an active or idle state and the second communication circuit is in a sleep state, the first CP has a control right. If the second communication circuit is in a sleep state and the first communication circuit is in an active or idle state, the second CP has a control right.

Figure 7:
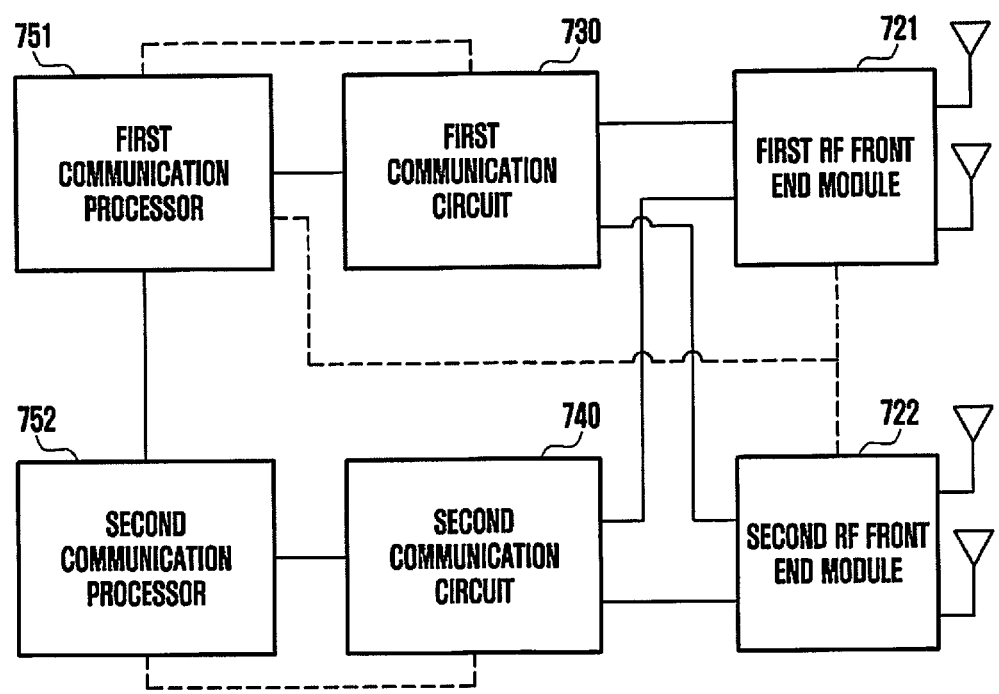
FIG. 7 illustrates a circuit diagram of a portable communication device according to an embodiment.

FIG. 7 illustrates a circuit diagram of a portable communication device according to an embodiment.

Referring to FIG. 7, a portable communication device includes a first CP 751, a second CP 752, a first communication circuit 730, a second communication circuit 740, a first RF front end module 721, and a second RF front end module 722. One of the first CP 751 and the second CP 752 of a portable communication device 700 may a control right over the first RF front end module 721 and the second RF front end module 722.

The first CP 751 may include a configuration (e.g., a comprehensive control signal generator) for generating control signals for the first RF front end module 721 and the second RF front end module 722. In this case, the second CP 752 may transmit a communication state (e.g., band, channel, transmission power, etc.) of a second cellular network through a sync connection with the first CP 751, and the first CP 751 may combine a communication state of the first cellular network and the communication state of the second cellular network to generate a control signal for a shared RF front end module.

A portable communication device according to an embodiment may include an antenna configured to receive a first signal belonging to a first frequency band corresponding to a first cellular network, and a second signal belonging to a second frequency band corresponding to a second cellular network; a first communication circuit electrically connected to the antenna and corresponding to the first cellular network; a second communication circuit electrically connected to the antenna and corresponding to the second cellular network; a distributor configured to electrically connect the antenna to the first communication circuit and the second communication circuit; a first LNA connected between the distributor and the first communication circuit; and a second LNA connected between the distributor and the second communication circuit, wherein while one communication circuit between the first communication circuit and the second communication circuit is not driven, the other communication circuit is configured to be driven.

The first communication circuit may be configured to adjust a first gain for the first LNA with respect to the first signal obtained through the distributor, and the second communication circuit is configured to adjust a second gain for the second LNA with respect to the second signal obtained through the distributor.

The first communication circuit may be configured to perform an operation of adjusting the first gain, based at least partially on a first electric field corresponding to the first signal, and the second communication circuit may be configured to perform an operation of adjusting the second gain, based at least partially on a second electric field corresponding to the second signal.

The first frequency band and the second frequency band may at least partially overlap each other.

The first frequency band and the second frequency band may be discrete from each other.

The first signal and the second signal may be signals transmitted by different wireless communication schemes.

The first signal may be transmitted by a legacy communication scheme including at least one of a second generation communication network, a third generation communication network, and a LTE communication network, and the second signal may be transmitted by a fifth generation NR network communication scheme.

The portable communication device may further include a CP, and the CP may be configured to control the first communication circuit and the second communication circuit, such that while the one communication circuit is not driven, the other communication circuit is driven.

The CP may include a first CP configured to control transmission and reception of the first signal, and a second CP configured to control transmission and reception of the second signal, wherein, if the first communication circuit is activated and the second communication circuit is deactivated, the first CP is configured to control the first communication circuit and the second communication circuit, and if the first communication circuit is deactivated and the second communication circuit is activated, the second CP is configured to control the first communication circuit and the second communication circuit.

The portable communication device may further include an AP, which may be configured to control the first communication circuit and the second communication circuit, such that while the one communication circuit is not driven, the other communication circuit is driven.

The portable communication device may further include a third LNA electrically connected between the antenna and the distributor.

The third LNA may have a fixed gain and may be configured to be turned on/off.

The third LNA, the distributor, the first LNA, and the second LNA may form at least a part of a front end module.

In a method for controlling a portable communication device supporting multiple different communication networks according to an embodiments, wherein the portable communication device include an antenna configured to receive a first signal belonging to a first frequency band corresponding to a first cellular network, and a second signal belonging to a second frequency band corresponding to a second cellular network; a first communication circuit electrically connected to the antenna and corresponding to the first cellular network; a second communication circuit electrically connected to the antenna and corresponding to the second cellular network; a distributor configured to electrically connect the antenna to the first communication circuit and the second communication circuit; a first LNA connected between the distributor and the first communication circuit; and a LNA connected between the distributor and the second communication circuit, the method includes driving one of the first communication circuit and the second communication circuit, while the other communication circuit is not driven.

The first communication circuit may adjust a gain for the first LNA with respect to the first signal obtained through the distributor, and the second communication circuit may adjust a gain for the second LNA with respect to the second signal obtained through the distributor.

The first communication circuit may perform an operation of adjusting the first gain, based at least partially on a first electric field corresponding to the first signal, and the second communication circuit may perform an operation of adjusting the second gain, based at least partially on a second electric field corresponding to the second signal.

The portable communication device may further include a CP, and the CP may control the first communication circuit and the second communication circuit such that while the one communication circuit is not driven, the other communication circuit is driven.

The CP may include a first CP configured to control transmission and reception of the first signal of the first frequency band, and a second CP configured to control transmission and reception of the second signal of the second frequency band, wherein if the first communication circuit is driven, the CP may transmit a control signal to the first communication circuit and the second communication circuit by using the first CP, and if the second communication circuit is driven, the CP may transmit a control signal to the first communication circuit and the second communication circuit by using the second CP.

In a non-transitory storage medium that stores commands that are readable by a portable communication device, which includes an antenna configured to receive a first signal belonging to a first frequency band corresponding to a first cellular network, and a second signal belonging to a second frequency band corresponding to a second cellular network; a first communication circuit electrically connected to the antenna and corresponding to the first cellular network; a second communication circuit electrically connected to the antenna and corresponding to the second cellular network; a distributor configured to electrically connect the antenna to the first communication circuit and the second communication circuit; a first LNA connected between the distributor and the first communication circuit; and a second LNA connected between the distributor and the second communication circuit, wherein the commands include an operation of configuring, when the commands are executed one of the first communication circuit and the second communication circuit is not driven, while the other communication circuit is driven.

While the disclosure has been particularly shown and described with reference to certain embodiments thereof, it will be understood by those of ordinary skill in the art that various changes in form and details may be made therein without departing from the spirit and scope of the disclosure as defined by the following claims and their equivalents.

What is claimed is:

1. A portable communication device, comprising:
an antenna configured to receive a first signal of a first frequency band corresponding to a first cellular network, and a second signal of a second frequency band corresponding to a second cellular network;
a first communication circuit electrically connected to the antenna and corresponding to the first cellular network;
a second communication circuit electrically connected to the antenna and corresponding to the second cellular network;
a distributor configured to electrically connect the antenna to the first communication circuit and the second communication circuit;
a first low noise amplifier (LNA) connected between the distributor and the first communication circuit; and
a second LNA connected between the distributor and the second communication circuit,
wherein the first signal is distributed to the first LNA by the distributor and the first LNA is configured to amplify the first signal and output the amplified first signal to the first communication circuit,
wherein the second signal is distributed to the second LNA by the distributor and the second LNA is configured to amplify the second signal and output the amplified second signal to the second communication circuit, and
wherein while the first communication circuit is activated to receive the first signal of the first cellular network, the second communication circuit corresponding to the second cellular network is configured to be deactivated.

2. The device of claim 1, wherein the first communication circuit is configured to adjust a first gain for the first low noise amplifier with respect to the first signal obtained through the distributor, and
wherein the second communication circuit is configured to adjust a second gain for the second low noise amplifier with respect to the second signal obtained through the distributor.

3. The device of claim 2, wherein the first communication circuit is further configured to adjust the first gain, based on a first electric field corresponding to the first signal, and
wherein the second communication circuit is further configured to adjust the second gain, based on a second electric field corresponding to the second signal.

4. The device of claim 2, wherein a third LNA, the distributor, the first LNA, and the second LNA are included in a front end module.

5. The device of claim 1, wherein the first frequency band and the second frequency band at least partially overlap each other.

6. The device of claim 1, wherein the first frequency band and the second frequency band do not overlap each other.

7. The device of claim 1, wherein the first signal and the second signal are transmitted using different wireless communication schemes.

8. The device of claim 1, wherein the first signal is transmitted using a legacy communication scheme including at least one of a second generation communication network, a third generation communication network, and a long term evolution (LTE) communication network, and
wherein the second signal is transmitted using a fifth generation new radio (NR) network communication scheme.

9. The device of claim 1, further comprising a communication processor configured to control driving and not driving of the first communication circuit and the second communication circuit.

10. The device of claim 9, wherein the communication processor comprises:
a first communication processor configured to control transmission and reception of the first signal; and
a second communication processor configured to control transmission and reception of the second signal,
wherein, if the first communication circuit is activated and the second communication circuit is deactivated, the first communication processor is further configured to control the first communication circuit and the second communication circuit, and
wherein, if the first communication circuit is deactivated and the second communication circuit is activated, the second communication processor is further configured to control the first communication circuit and the second communication circuit.

11. The device of claim 1, further comprising an application processor configured to control activation and deactivation of the first communication circuit and the second communication circuit.

12. The device of claim 1, further comprising a third LNA electrically connected between the antenna and the distributor.

13. The device of claim 12, wherein the third LNA has a fixed gain and is configured to be turned on or off.

14. The device of claim 12, wherein the third LNA, the distributor, the first LNA, and the second LNA are included in a front end module.

15. A method for controlling a portable communication device, which includes an antenna configured to receive a first signal of a first frequency band corresponding to a first cellular network, and a second signal of a second frequency band corresponding to a second cellular network, a first communication circuit electrically connected to the antenna and corresponding to the first cellular network, a second communication circuit electrically connected to the antenna and corresponding to the second cellular network, a distributor configured to electrically connect the antenna to the first communication circuit and the second communication circuit, a first low noise amplifier (LNA) connected between the distributor and the first communication circuit, and a second LNA connected between the distributor and the second communication circuit, the method comprising:

deactivating the second communication circuit corresponding to the second cellular network, while the first communication circuit is activated to receive the first signal of the first cellular network, wherein the first signal is distributed to the first LNA by the distributor and the first LNA is configured to amplify the first signal and output the amplified first signal to the first communication circuit, and wherein the second signal is distributed to the second LNA by the distributor and the second LNA is configured to amplify the second signal and output the amplified second signal to the second communication circuit.

16. The method of claim 15, further comprising:

adjusting, by the first communication circuit, a first gain for the first LNA with respect to the first signal obtained through the distributor; and adjusting, by the second communication circuit, a second gain for the second LNA with respect to the second signal obtained through the distributor.

17. The method of claim 16, wherein adjusting the first gain comprises adjusting the first gain, based on a first electric field corresponding to the first signal, and wherein adjusting the second gain comprises adjusting the second gain, based on a second electric field corresponding to the second signal.

18. The method of claim 15, wherein a communication processor of portable communication device drives, while one communication circuit between of the first communication circuit and the second communication circuit is not driven, the other communication circuit.

19. The method of claim 18, wherein the communication processor includes a first communication processor configured to control transmission and reception of the first signal of the first frequency band, and a second communication processor configured to control transmission and reception of the second signal of the second frequency band, wherein, if the first communication circuit is activated, the communication processor transmits a control signal to the first communication circuit and the second communication circuit by using the first communication processor, and wherein, if the second communication circuit is activated, the communication processor transmits a control signal to the first communication circuit and the second communication circuit by using the second communication processor.

* * * * *